United States Patent
Yamada et al.

(10) Patent No.: US 10,841,785 B2
(45) Date of Patent: Nov. 17, 2020

(54) CORE NODE, RADIO TERMINAL, COMMUNICATION METHOD, AND NON-TRANSITORY COMPUTER READABLE MEDIUM

(71) Applicant: NEC CORPORATION, Tokyo (JP)

(72) Inventors: Toru Yamada, Tokyo (JP); Yumiko Okuyama, Tokyo (JP); Masashi Shimoma, Tokyo (JP); Akira Kamei, Tokyo (JP); Masahiro Serizawa, Tokyo (JP); Kyoji Hirata, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/080,383

(22) PCT Filed: Nov. 28, 2016

(86) PCT No.: PCT/JP2016/004980
§ 371 (c)(1),
(2) Date: Aug. 28, 2018

(87) PCT Pub. No.: WO2017/149574
PCT Pub. Date: Sep. 8, 2017

(65) Prior Publication Data
US 2019/0069159 A1 Feb. 28, 2019

(30) Foreign Application Priority Data
Mar. 3, 2016 (JP) .................. 2016-040986

(51) Int. Cl.
*H04W 8/04* (2009.01)
*H04W 76/18* (2018.01)
(Continued)

(52) U.S. Cl.
CPC .......... *H04W 8/04* (2013.01); *H04W 28/0205* (2013.01); *H04W 76/18* (2018.02); *H04W 8/065* (2013.01); *H04W 88/14* (2013.01)

(58) Field of Classification Search
CPC ... H04W 8/04; H04W 28/0205; H04W 76/18; H04W 88/14; H04W 28/02; H04W 8/065; H04W 48/17; H04W 76/19; H04M 3/00
See application file for complete search history.

(56) References Cited

U.S. PATENT DOCUMENTS

| 9,749,897 | B2* | 8/2017 | Cho ............... H04W 28/02 |
| 2011/0199905 | A1* | 8/2011 | Pinheiro .......... H04W 28/0215 370/235 |
| 2019/0028887 | A1* | 1/2019 | Ryu ............... H04W 28/0289 |

FOREIGN PATENT DOCUMENTS

| JP | 2014-505421 A | 2/2014 |
| WO | 2016/178373 A1 | 11/2016 |

OTHER PUBLICATIONS

NTT DOCOMO, "Group specific NAS level congestion control", 3GPP TSG-CT WG1#93 C1-152686, Aug. 17-21, 2015, pp. 1-7, Vancouver, Canada.
(Continued)

*Primary Examiner* — Marcos L Torres
(74) *Attorney, Agent, or Firm* — Sughrue Mion, PLLC

(57) ABSTRACT

The present disclosure aims to provide a core node capable of reducing the number of messages or an amount of data to be transmitted to the core node. A core node (10) according to the present disclosure includes: a congestion state detector (11) configured to detect a congestion state of an own apparatus; a communication unit (13) configured to receive a NAS request message that has specified an APN from a radio terminal (20); and a controller (12) configured to determine that processing regarding the NAS request message will not be executed while the congestion state of the
(Continued)

own apparatus is being detected. The communication unit (13) transmits a reject message including a plurality of APNs that can be specified by the radio terminal (20) to the radio terminal (20) when it is determined in the controller (12) that the processing regarding the NAS request message will not be executed.

5 Claims, 10 Drawing Sheets

(51) Int. Cl.
*H04W 28/02* (2009.01)
*H04W 88/14* (2009.01)
*H04W 8/06* (2009.01)

(56) References Cited

OTHER PUBLICATIONS

3GPP TS 23.401 V13.5.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Dec. 2015, pp. 1-337.
International Search Report of PCT/JP2016/004980 dated Feb. 7, 2017 [PCT/ISA/210].

* cited by examiner

CORE NODE, RADIO TERMINAL, COMMUNICATION METHOD, AND NON-TRANSITORY COMPUTER READABLE MEDIUM

CROSS REFERENCE TO RELATED APPLICATIONS

This application is a National Stage of International Application No. PCT/JP2016/004980, filed Nov. 28, 2016, claiming priority based on Japanese Patent Application No. 2016-040986, filed Mar. 3, 2016, the disclosure of which is incorporated herein in its entirety by reference.

TECHNICAL FIELD

The present disclosure relates to a core node, a radio terminal, a communication method, and a program, and more particularly, to a core node, a radio terminal, a communication method, and a program executing congestion control.

BACKGROUND ART

A mobile communication system includes a radio terminal, a Radio Access Network (RAN), and a mobile core network. Further, the mobile core network includes a relay node that relays user plane data and a control node that relays control plane data. The relay node is, for example, a Serving Gateway (SGW), a Packet data network Gateway (PGW) and the like. The control node is, for example, a Mobility Management Entity (MME). The control node executes, for example, Mobility Management (MM), Session Management (SM) and the like. The relay node and the control node may be referred to as a core node.

The control node transmits Non-Access Stratum (NAS) messages to the radio terminal in order to execute the mobility management and the session management. The control node further receives the NAS message transmitted from the radio terminal. The NAS messages are control messages that are not terminated at the RAN and are transparently transmitted between the radio terminal and the MME without depending on the radio access technology of the RAN. Non-Patent Literature 1 discloses detailed descriptions regarding the NAS messages.

Non-Patent Literature 1 further discloses a technique regarding congestion control to reduce an overload or congestion in the mobile core network. When, for example, the MME receives a NAS message regarding the session management or the mobility management from the radio terminal in the state in which the MME is in the congestion state, the MME rejects processing regarding the NAS message that has been received. In this case, the MME transmits a reject message that specifies a back-off timer value to the radio terminal.

The radio terminal does not transmit the NAS message to the MME until the back-off timer value specified in the MME expires. In this way, the MME reduces the processing load in the congestion state.

CITATION LIST

Non-Patent Literature

[Non-Patent Literature 1] 3GPP TS23.401 V13.5.0 (2015-12)

SUMMARY OF INVENTION

Technical Problem

However, the congestion control disclosed in Non-Patent Literature 1 has the following problem. The radio terminal specifies an Access Point Name (APN) when it transmits the NAS message. The APN is an identifier of an external network used in an Evolved Packet Core (EPC). In other words, the APN is an identifier of the external network that provides a service that the radio terminal uses. The radio terminal transmits a NAS message that specifies an APN the same as that specified in the NAS message that has been rejected to the MME after the back-off timer has expired. However, the radio terminal is able to transmit a NAS message that specifies an APN different from the APN specified in the NAS message that has been rejected to the MME before the back-off timer expires. Therefore, the MME cannot suppress transmission of the NAS message that specifies the APN different from the APN specified in the NAS message whose processing has been rejected. Accordingly, the NAS message is transmitted to the MME, which is in the congestion state, whereby it is impossible to reduce the processing load of the MME.

The present disclosure aims to provide a core node, a radio terminal, a communication method, and a program capable of reducing the number of messages or the amount of data to be transmitted to the core node.

Solution to Problem

A core node according to a first aspect of the present disclosure includes: a congestion state detector configured to detect a congestion state of an own apparatus; a communication unit configured to receive a NAS request message that has specified an APN from a radio terminal; and a controller configured to determine that processing regarding the NAS request message will not be executed while the congestion state of the own apparatus is being detected, in which the communication unit transmits a reject message including a plurality of APNs that can be specified by the radio terminal to the radio terminal when it is determined in the controller that the processing regarding the NAS request message will not be executed.

A radio terminal according to a second aspect of the present disclosure includes: a communication unit configured to receive a reject message indicating that processing regarding a NAS request message should be rejected, in which a plurality of APNs that can be specified in an own apparatus are included in the reject message, and transmission of the NAS request message that has specified the plurality of APNs configured in the reject message is stopped until a specific message transmitted from a core node is received when the reject message is received.

A communication method according to a third aspect of the present disclosure includes: detecting a congestion state of an own apparatus; receiving a NAS request message that has specified an APN from a radio terminal; determining that processing regarding the NAS request message will not be executed while the congestion state of the own apparatus is being detected; and transmitting a reject message including a plurality of APNs that can be specified by the radio terminal to the radio terminal when it is determined that the processing regarding the NAS request message will not be executed.

A program according to a fourth aspect of the present disclosure causes a computer to execute the following processing of: detecting a congestion state of an own apparatus; receiving a NAS request message that has specified an APN from a radio terminal; determining that processing regarding the NAS request message will not be executed while the congestion state of the own apparatus is being detected; and transmitting a reject message including a plurality of APNs that can be specified by the radio terminal to the radio terminal when it is determined that the processing regarding the NAS request message will not be executed.

Advantageous Effects of Invention

According to the present disclosure, it is possible to provide a core node, a radio terminal, a communication method, and a program capable of reducing the number of messages or the amount of data to be transmitted to the core node.

DESCRIPTION OF EMBODIMENTS

First Embodiment

Figure 1:
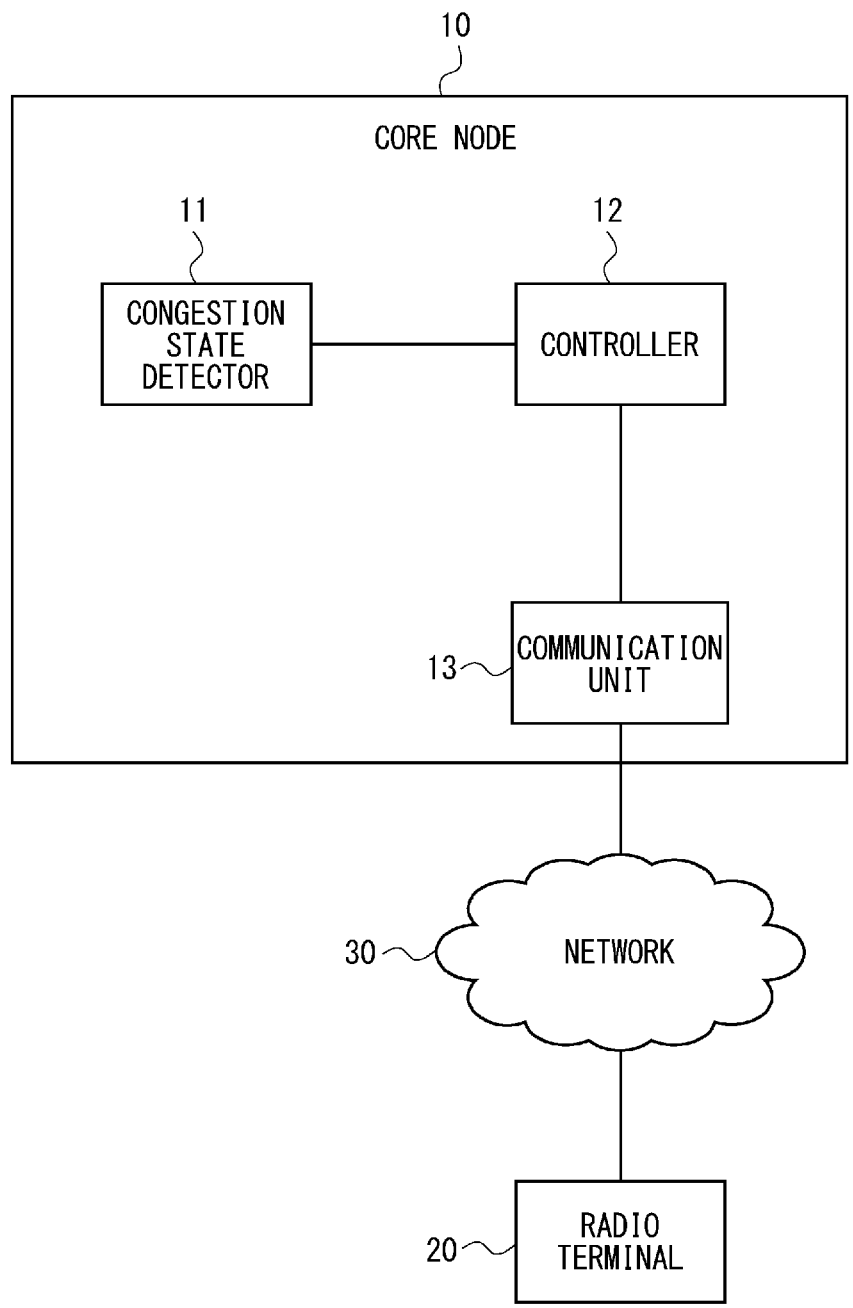
FIG. 1 is a configuration diagram of a core node according to a first embodiment.

In the following description, with reference to the drawings, embodiments of the present disclosure will be explained. FIG. 1 shows a configuration example of a core node 10 according to a first embodiment of the present disclosure. The core node 10, which is a node arranged in a mobile core network, may be a control node or a relay node. The core node 10 may be a computer apparatus that is operated by a processor executing a program stored in a memory. The core node 10 communicates with a radio terminal 20 via a network 30.

The network 30 may be, for example, a RAN. The radio terminal 20 may be, for example, a mobile telephone terminal, a smart phone terminal, a tablet terminal, or a Machine to Machine (M2M) terminal that has a communication function. The M2M terminal may also be referred to as, for example, a Machine Type Communication (MTC).

The core node 10 includes a congestion state detector 11, a controller 12, and a communication unit 13. The congestion state detector 11, the controller 12, and the communication unit 13 may each be formed of software, a module or the like whose processing is executed by a processor executing a program stored in a memory. Alternatively, the congestion state detector 11, the controller 12, and the communication unit 13 may each be formed of hardware such as a circuit or a chip.

The congestion state detector 11 detects the congestion state of the core node 10. The congestion state of the core node 10 may be a state in which the processing load of the core node 10 is high. The state in which the processing load is high may be, for example, a state in which the processor utilization, the memory utilization or the like of the core node 10 is higher than a predetermined threshold. Alternatively, the congestion state may be a state in which the number of messages transmitted or received in the core node 10 is larger than a predetermined threshold. Alternatively, the congestion state may be a state in which the number of radio terminals 20 managed or controlled by the core node 10 is larger than a predetermined threshold.

The communication unit 13 receives a NAS request message that has specified the APN from the radio terminal 20. The NAS request message is a NAS message that is used in an Attach request, a session (bearer) request, or a location update request. The location update may be, for example, a Tracking Area Update (TAU) or a Routing Area Update (RAU).

The controller 12 determines that it will not execute processing regarding the NAS request message received in the communication unit 13 while the congestion state of the core node 10 is being detected. Instead of saying that the controller 12 does not execute the processing regarding the NAS request message, it can be said that the controller 12 rejects the processing regarding the NAS request message. Alternatively, the controller 12 may discard or dispose of the NAS request message before it executes the processing regarding the NAS request message when it determines that it will not execute the processing regarding the NAS request message.

When it is determined in the controller 12 that it will not execute the processing regarding the NAS request message, the communication unit 13 transmits a reject message including a plurality of APNs that can be specified by the radio terminal 20 to the radio terminal 20. The plurality of APNs that can be specified by the radio terminal 20 include the APN included in the NAS request message whose processing it has been determined not to execute.

The communication unit 13 or the controller 12 may acquire information regarding the plurality of APNs that can be specified by the radio terminal 20 from a Home Subscriber Server (HSS) that manages subscriber information after, for example, it is determined in the controller 12 that it will not execute the processing regarding the NAS request message. Alternatively, the communication unit 13 or the controller 12 may acquire information regarding the plurality of APNs that can be specified by the radio terminal 20 from the HSS that manages the subscriber information in advance before it is determined in the controller 12 that it will not execute the processing regarding the NAS request message.

The reject message is used to notify the radio terminal 20 that the processing regarding the NAS request message will not be executed. Specifically, upon receiving the reject message, the radio terminal 20 does not transmit the NAS request message that has specified the APN included in the reject message to the core node 10. Further, the radio terminal 20 does not transmit the NAS request message to the core node 10 until it receives a specific message transmitted from the core node 10. In other words, the radio terminal 20 transmits the NAS request message to the core node 10 after it receives the specific message transmitted from the core node 10.

Further, a back-off timer value indicating a period during which the radio terminal 20 cannot transmit the NAS request message may be configured in the reject message. However, the radio terminal 20 does not transmit the NAS request message to the core node 10 when it has not received the specific message transmitted from the core node 10 even after the back-off timer has expired.

As described above, the core node 10 according to the first embodiment of the present disclosure is able to determine that it will not execute the processing regarding the NAS request message transmitted from the radio terminal 20 while the congestion state is continuing. Further, the core node 10 is able to transmit, besides the APN specified by the NAS request message transmitted from the radio terminal 20, the reject message including information on the plurality of APNs that can be specified by the radio terminal 20, to the radio terminal 20.

The radio terminal 20 that has received the reject message does not transmit the NAS request message that has specified the APN included in the reject message to the core node 10. Accordingly, the core node 10 is able to reduce the number of NAS request messages transmitted from the radio terminal 20, whereby it is possible to suppress an increase in the processing load of the own apparatus.

Second Embodiment

Figure 2:
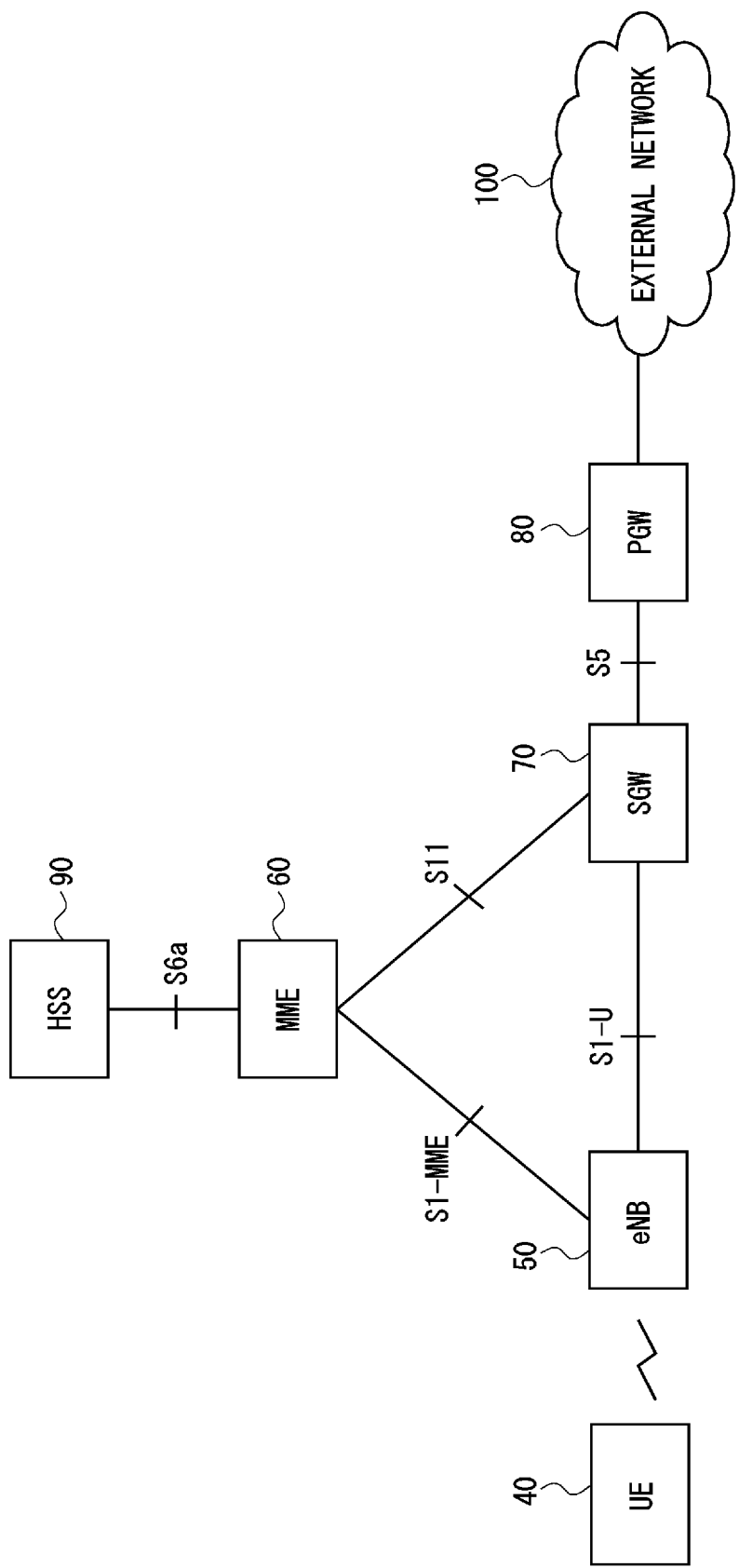
FIG. 2 is a configuration diagram of a communication system according to a second embodiment.

Next, with reference to FIG. 2, a configuration example of a communication system according to a second embodiment of the present disclosure will be explained. The communication system shown in FIG. 2 shows a configuration example of the communication system defined by the 3GPP, and includes a User Equipment (UE) 40, an eNB 50, an MME 60, an SGW 70, a PGW 80, a Home Subscriber Server (HSS) 90, and an external network 100. The UE 40 is used as a general term for the radio terminal in the 3GPP. The UE 40 corresponds to the radio terminal 20 shown in FIG. 1. The UE 40 may be, for example, an MTC device or the like. The eNB 50 is a base station that supports Long Term Evolution (LTE) defined by the 3GPP to be a radio access technology. The eNB 50 is arranged in the RAN.

The MME 60, the SGW 70, and the PGW 80 correspond to the core node 10 shown in FIG. 1. An S1-MME is defined as a reference point between the MME 60 and the eNB 50. An S1-U is defined as a reference point between the eNB 50 and the SGW 70. An S5 is defined as a reference point between the SGW 70 and the PGW 80.

The HSS 90 manages subscriber data regarding a plurality of UEs including the UE 40. The HSS 90 manages, for example, information regarding the plurality of APNs that can be specified by the respective UEs. An S6a is defined as a reference point between the HSS 90 and the MME 60.

The external network 100 is a network different from a mobile core network. The external network 100 may be, the so-called internet or a Packet Data Network (PDN). Further, the external network may be, for example, a network managed by a provider or the like that provides communication services for the UE 40. The communication service may be referred to as, for example, an application service, a cloud service, an internet service or the like. The provider that provides the communication service may be, for example, an Internet Service Provider (ISP), an Application Service Provider (ASP) or the like.

The APN is used as information for identifying the external network 100. That is, the UE 40 is able to communicate with a communication apparatus arranged in the external network 100 by specifying the APN that indicates the external network 100. In other words, the UE 40 is able to receive the service provided by the external network 100 by specifying the APN that indicates the external network 100.

Figure 3:
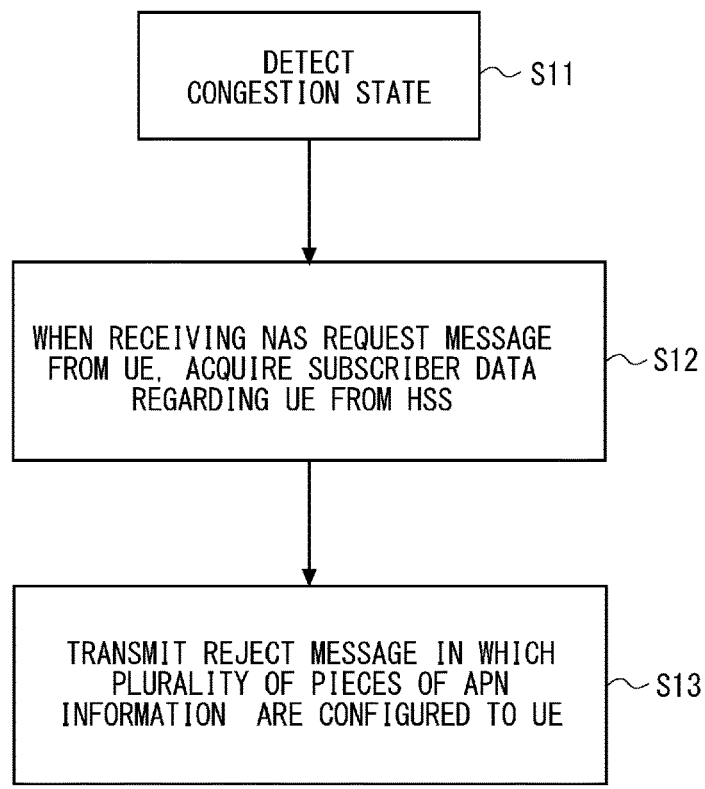
FIG. 3 is a diagram for describing a flow of processing in which an MME according to the second embodiment transmits a reject message.

Next, with reference to FIG. 3, a flow of processing in which the MME 60 according to the second embodiment of the present disclosure transmits a REJECT message will be explained. The MME 60 has a configuration similar to that of the core node 10 in FIG. 1.

First, the congestion state detector 11 detects the congestion state in the MME 60 (S11). The MME 60 may execute, for example, mobility management congestion control of a NAS level executed in the overload state regardless of a specific APN as the congestion control. Specifically, the controller 12 rejects the NAS request message regarding session management or mobility management while the congestion state is continuing. In other words, the controller 12 does not execute the processing regarding the NAS request message while the congestion state is continuing.

Next, when the communication unit 13 receives the NAS request message transmitted from the UE 40 while the congestion state is continuing, the communication unit 13 acquires the subscriber data regarding the UE 40 from the HSS 90 (S12). The subscriber data regarding the UE 40 includes a plurality of APNs that can be specified by the UE 40. Alternatively, the subscriber data regarding the UE 40 may include all the APNs that can be specified by the UE 40.

Next, the communication unit 13 transmits the REJECT message in which the plurality of APNs including the APN specified in the NAS request message have been configured to the UE 40 (S13). The communication unit 13 may configure all the APNs configured in the subscriber data acquired from the HSS in the REJECT message or may configure two or more APNs, among the plurality of APNs configured in the subscriber data, the two or more APNs being rejected to be specified by the UE 40, in the REJECT message. The communication unit 13 transmits the REJECT message to the UE 40 in order to stop transmission of the NAS request message that has specified the APN configured in the REJECT message.

Figure 4:
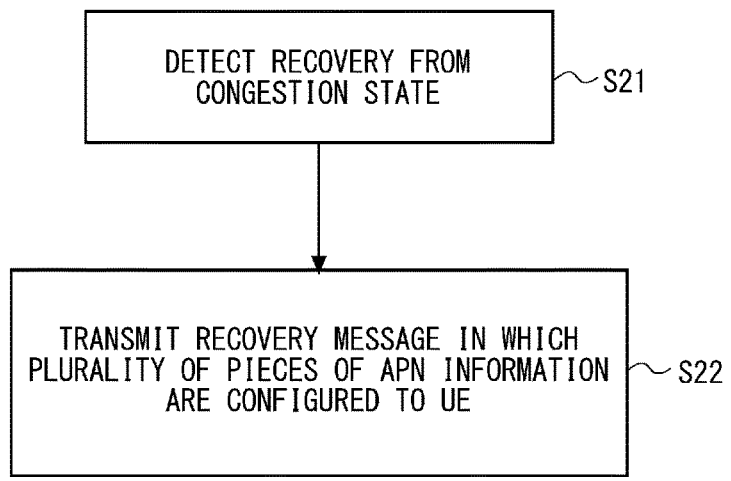
FIG. 4 is a diagram for describing a flow of processing of a case in which the MME according to the second embodiment has recovered from a congestion state.

With reference next to FIG. 4, a flow of the processing of a case in which the MME 60 according to the second embodiment of the present disclosure has recovered from the congestion state will be explained. First, the congestion state detector 11 detects that the core node 10 has recovered from the congestion state (S21). The congestion state detector 11 may determine that the core node 10 has recovered from the congestion state when, for example, the number of NAS request messages that should be processed is below a predetermined threshold. Alternatively, the congestion state detector 11 may determine that the core node 10 has recovered from the congestion state when the processor utilization or the memory utilization of the core node 10 is below a predetermined threshold.

Next, the communication unit 13 transmits a RECOVERY message in which the plurality of APNs configured in the REJECT message have been configured to the UE 40 (S22). The communication unit 13 transmits the RECOVERY message to the UE 40 in order to permit transmission of the NAS request message that has specified the APNs configured in the RECOVERY message.

The communication unit 13 may configure all the APNs configured in the REJECT message in the RECOVERY message or may configure some of the APNs configured in the REJECT message in the RECOVERY message.

There is a case, in which, for example, the MME 60 gradually recovers from the congestion state in accordance with the processor utilization, the memory utilization or the like. In this case, the communication unit 13 may transmit the RECOVERY message to the UE 40 in accordance with the gradual recovery from the congestion state. The communication unit 13 may transmit, for example, the RECOVERY message in each of the stage in which the MME 60 has recovered from the congestion state by 10%, the stage in which it has recovered by 30%, the stage in which it has recovered by 50%, and the stage in which it has recovered by 100%. Further, the communication unit 13 may configure some of the APNs configured in the REJECT message in the RECOVERY message transmitted in accordance with the gradual recovery from the congestion state. That is, the communication unit 13 may configure all the APNs configured in the REJECT message in a plurality of RECOVERY messages in a divided manner.

Figure 5:
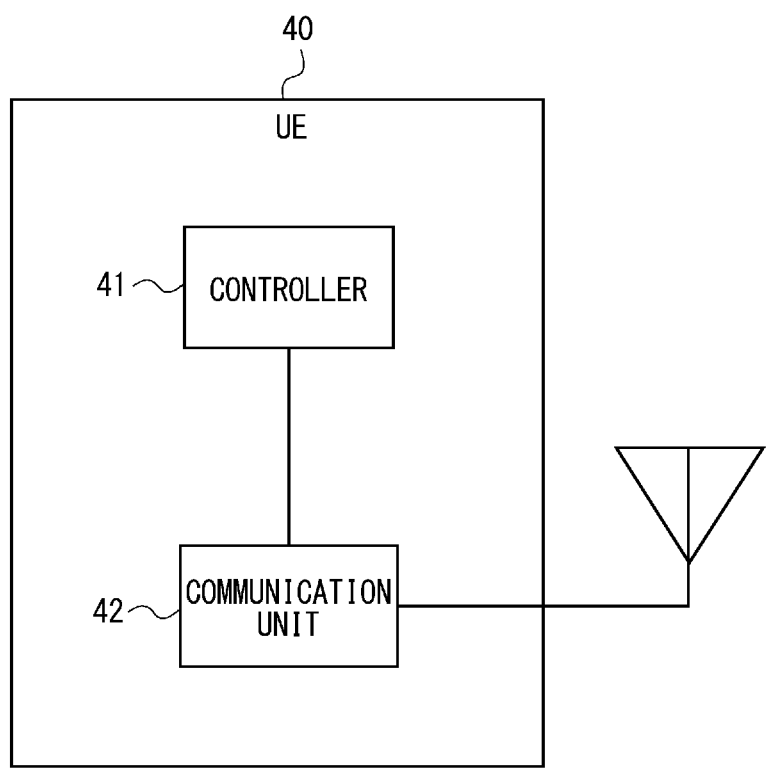
FIG. 5 is a configuration diagram of a UE according to the second embodiment.

With reference next to FIG. 5, a configuration example of the UE 40 according to the second embodiment of the present disclosure will be explained. The UE 40 includes a controller 41 and a communication unit 42. The controller 41 and the communication unit 42 may each be software, a module or the like whose processing is executed by a processor executing a program stored in a memory. Alternatively, the controller 41 and the communication unit 42 may each be hardware such as a circuit or a chip.

The communication unit 42 transmits the NAS request message to the MME 60 via the eNB 50. The eNB 50 forwards the NAS request message to the MME 60 without terminating the NAS request message. Further, the communication unit 42 receives the REJECT message transmitted from the MME 60 via the eNB 50.

The controller 41 generates the NAS request message that has specified the APN. The controller 41 outputs the NAS request message that has been generated to the communication unit 42. Further, the controller 41 stops generation of the NAS request message that has specified the APN configured in the REJECT message. Alternatively, the controller 41 causes the communication unit 42 to stop transmission of the NAS request message that has specified the APN configured in the REJECT message.

The controller 41 may stop generation of the NAS request message in which the APN configured in the REJECT message has been specified until it receives the RECOVERY message transmitted from the MME 60.

Figure 6:
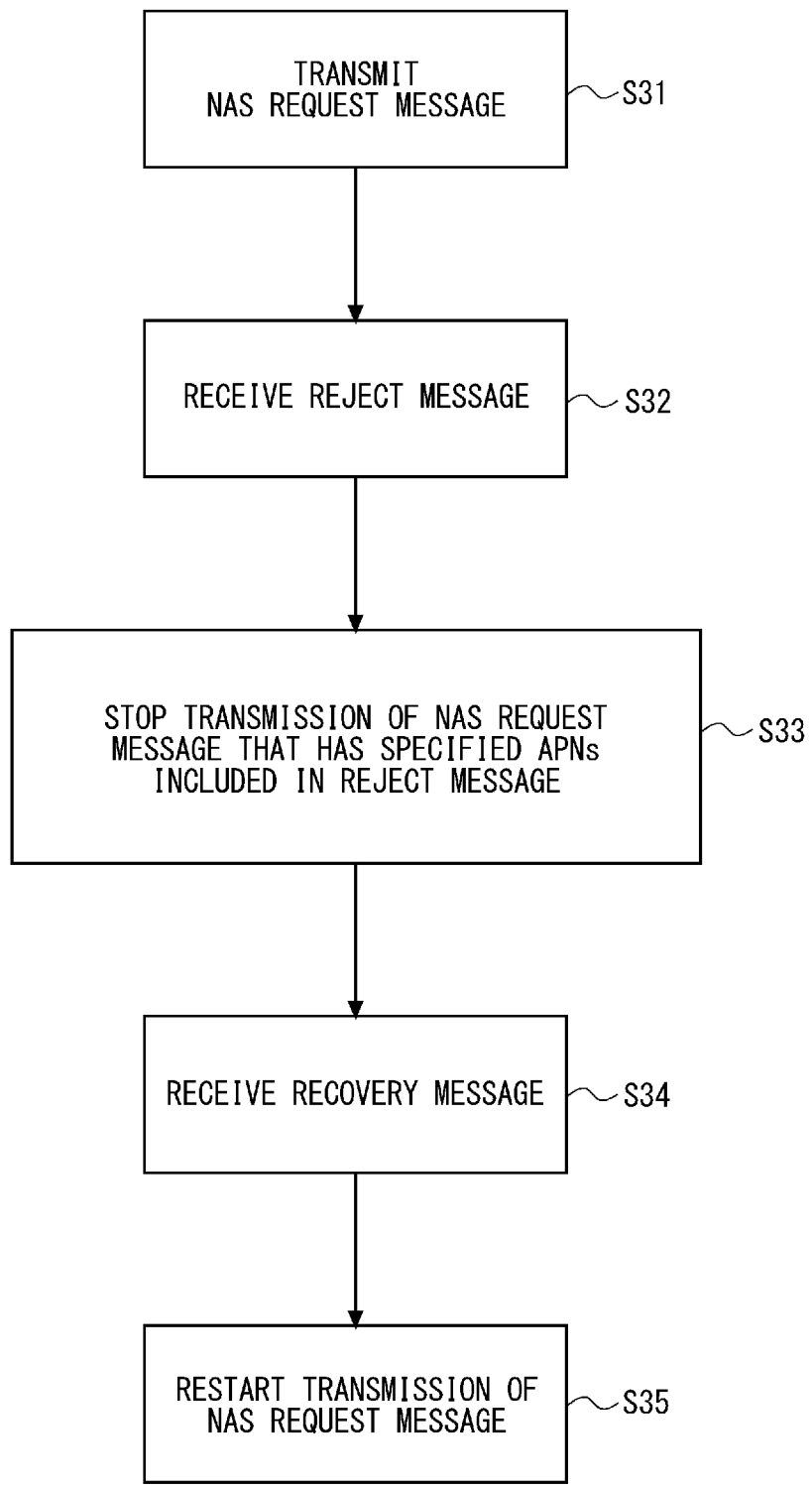
FIG. 6 is a diagram for describing a flow of processing of stopping transmission of a NAS request message and processing of restarting the transmission of the NAS request message in the UE according to the second embodiment.

With reference next to FIG. 6, a flow of processing of stopping the transmission of the NAS request message in the UE 40 and processing of restarting the transmission of the NAS request message according to the second embodiment of the present disclosure will be explained.

First, the communication unit 42 transmits the NAS request message to the eNB 50 via a radio communication line (S31). The communication unit 42 configures, in the NAS request message, the APN associated with the service to be used. Next, the communication unit 42 receives the REJECT message from the MME 60 via the eNB 50 (S32). The plurality of APNs that are prohibited to be used are configured in the REJECT message. The APN configured in the NAS request message transmitted in Step S31 is also included in the plurality of APNs configured in the REJECT message.

Next, the controller 41 stops generation of the NAS request message that has specified the plurality of APNs configured in the REJECT message (S33). Alternatively, the controller 41 causes the communication unit 42 to stop transmission of the NAS request message that has specified the plurality of APNs configured in the REJECT message.

Next, the communication unit 42 receives the RECOVERY message from the MME 60 via the eNB 50 (S34). A plurality of APNs that are available are configured in the RECOVERY message. The APNs configured in the RECOVERY message may be all the APNs configured in the REJECT message or may be some of the plurality of APNs configured in the REJECT message.

Next, the communication unit 42 restarts transmission of the NAS request message in which one APN that has been selected from among the plurality of APNs that are available has been configured (S35). The communication unit 42 may transmit the NAS request message transmitted in Step S31 to the eNB 50 again. Alternatively, the communication unit 42 may transmit the NAS request message in which an APN other than the APN configured in the NAS request message transmitted in Step S31 has been configured to the eNB 50.

The value of the back-off timer may be configured in the REJECT message that the communication unit 42 has received in Step S32. The controller 41 does not restart transmission of the NAS request message even when the back-off timer has expired before it receives the RECOVERY message in Step S34.

Figure 7:
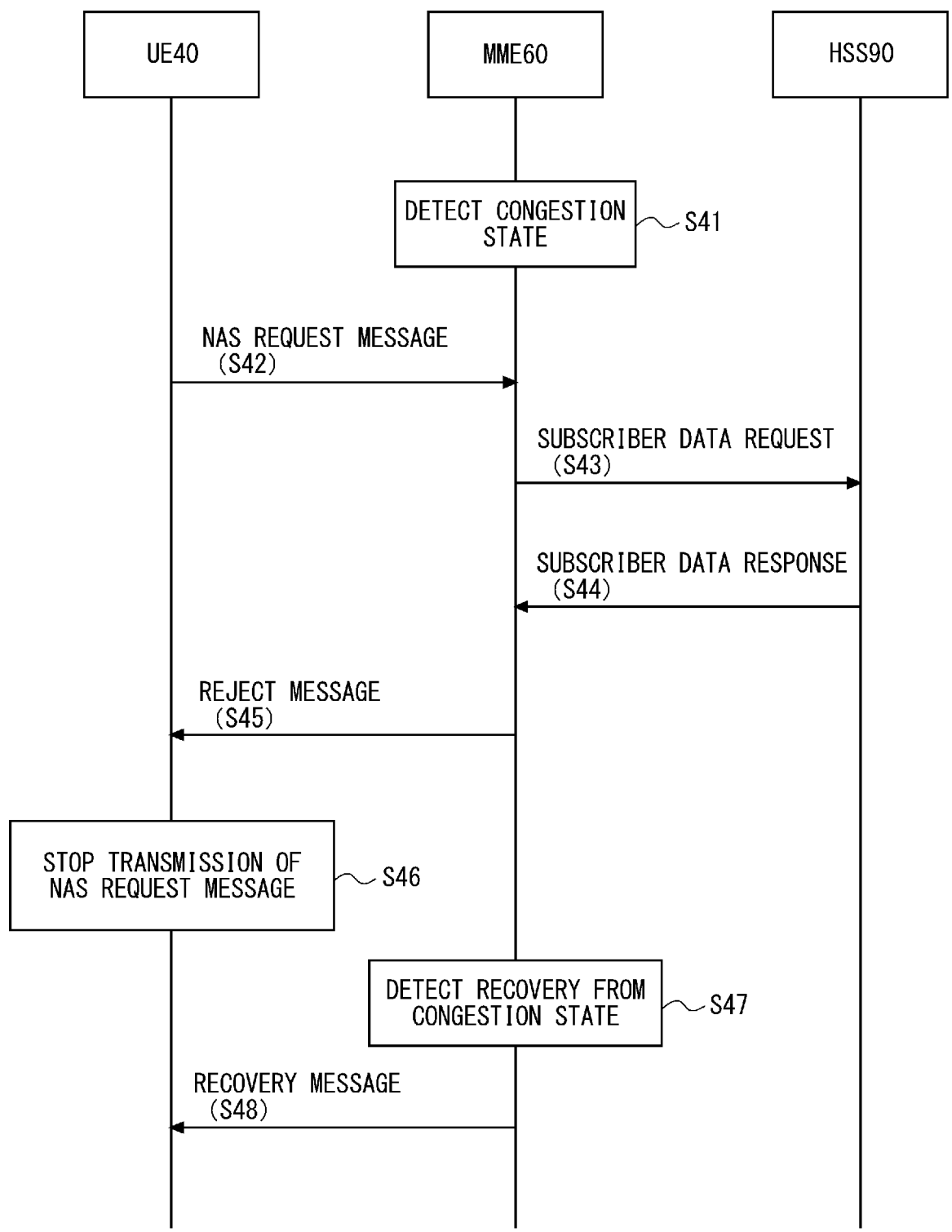
FIG. 7 is a diagram for describing a flow of processing when congestion occurs according to the second embodiment.

With reference next to FIG. 7, a flow of processing when congestion occurs in the UE 40, the MME 60, and the HSS 90 according to the second embodiment of the present disclosure will be explained. First, the MME 60 detects the congestion state (S41). Next, the UE 40 transmits the NAS request message to the MME 60 via the eNB 50 (S42). The APN associated with the service that the UE 40 uses is configured in the NAS request message.

Next, the MME 60 transmits a subscriber data request message to the HSS 90 in order to acquire the subscriber data of the UE 40 managed in the HSS 90 (S43). Identification information of the UE 40 is configured in the subscriber data request message. The identification information of the UE 40 may be, for example, International Mobile Subscriber Identity (IMSI).

Next, the HSS 90 transmits a subscriber data response message in which subscriber data including information regarding all the APNs that can be specified by the UE 40 has been configured to the MME 60 (S44). The HSS 90 configures subscriber data including only the information regarding a predetermined APN among all the APNs that can be specified by the UE 40 in the subscriber data response message when the APN regarding which a notification is sent in the subscriber data response message is predetermined. The predetermined APN may be a plurality of APNs. The predetermined APN may be defined in accordance with, for example, a criterion whether the frequency of the NAS message being transmitted is higher than a threshold. That is, the predetermined APN may be a NAS that gives a large influence on the processing load.

Next, the MME 60 transmits the REJECT message in which all the APNs included in the subscriber data have been configured to the UE 40 (S45). Alternatively, the MME 60 may configure only the APN that satisfies a predetermined criterion among all the APNs in the REJECT message. The predetermined criterion may be, for example, a criterion whether the frequency of the NAS message being transmitted is higher than a threshold.

Next, the UE 40 stops transmission of the NAS request message regarding all the APNs configured in the REJECT message (S46). In other words, the UE 40 stops transmission of the NAS request message that has specified the APN configured in the REJECT message.

When all the APNs that can be used by the UE have been configured in the REJECT message, the UE 40 stops transmission of all the NAS request messages.

Next, the MME 60 detects that it has recovered from the congestion state (S47). Next, the MME 60 transmits the RECOVERY message indicating that it has recovered from the congestion state to the UE 40 (S48). The MME 60 may configure all the APNs configured in the REJECT message in the RECOVERY message or may configure some of the plurality of APNs configured in the REJECT message in the RECOVERY message.

After the UE 40 receives the RECOVERY message, the UE 40 is able to transmit the NAS request message that has specified the APNs configured in the RECOVERY message.

As described above, the MME 60 according to the second embodiment of the present disclosure is able to configure the plurality of APNs that can be used by the UE 40 in the REJECT message. The UE 40 stops transmission of the NAS request message regarding the plurality of APNs configured in the REJECT message. Accordingly, the MME 60 is able to reduce the number of NAS request messages transmitted from the UE 40 while the congestion state is continuing, whereby it is possible to prevent the congestion state from being further worsened.

Further, the MME 60 configures all the APNs that can be used by the UE 40 in the REJECT message, whereby it is possible to stop the transmission of the NAS request message in the UE 40. Accordingly, the MME 60 is able to achieve a faster recovery from the congestion state compared to a case where the REJECT message in which some of all the APNs that can be used by the UE 40 are configured is transmitted to the UE 40.

Further, the MME 60 is able to transmit the RECOVERY message indicating the recovery from the congestion state to the UE 40. The UE 40 starts transmission of the NAS request message after it receives the RECOVERY message, whereby the MME 60 is able to avoid reception of the NAS request message regarding the UE that has transmitted the REJECT message while the congestion state is continuing. In other words, the MME 60 is able to avoid reception of the NAS request message from the UE 40 when the congestion state is continuing even when the back-off timer configured in the REJECT message has expired.

Third Embodiment

Figure 8:
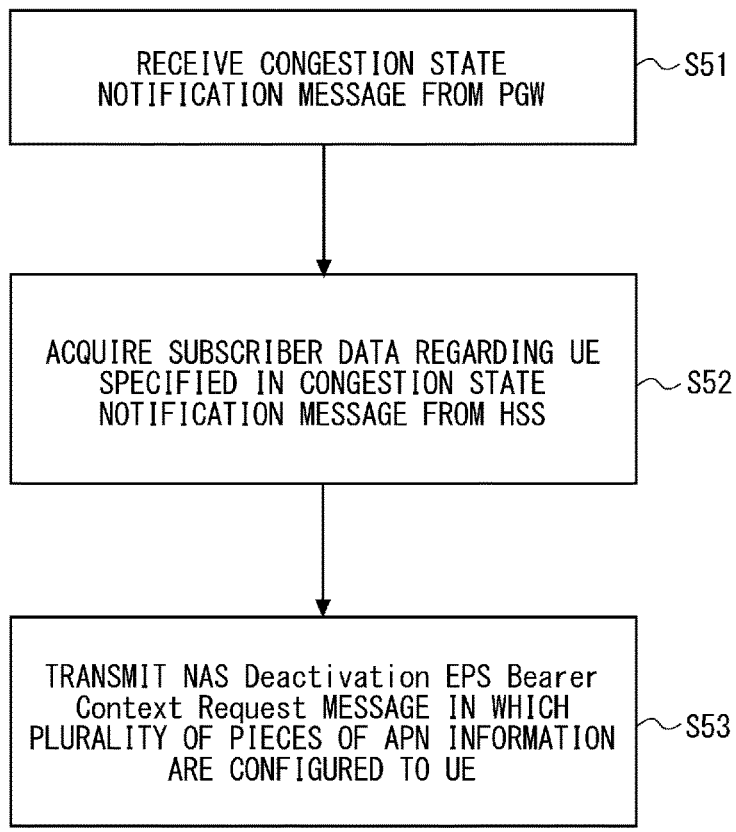
FIG. 8 is a diagram for describing a flow of processing of releasing a PDN connection in an MME according to a third embodiment.

With reference next to FIG. 8, a flow of processing of releasing the PDN connection in the MME 60 according to a third embodiment of the present disclosure will be explained. The MME 60 has a configuration similar to that of the core node 10 shown in FIG. 1.

The PDN connection is formed of one or more communication bearers between the UE 40 and the PGW 80. The PDN connection is established for each service provided for the UE 40. In other words, the PDN connection is established for each APN. The user plane data regarding the UE 40 is transmitted using the PDN connection established between the UE 40 and the PGW 80. The PDN connection is established at the time of Attach of the UE 40 or when processing in accordance with the NAS request message such as a Service Request message is executed in the core network.

It is assumed in FIG. 8 that at least one PDN connection regarding the UE 40 is established. First, the congestion state detector 11 receives a congestion state notification message transmitted from the PGW 80 (S51). The congestion state detector 11 detects that the congestion is occurring in the PGW 80 by receiving the congestion state notification message.

The congestion that occurs in the PGW 80 is APN-based congestion and may be, for example, an APN-based session management congestion and an APN-based mobility management congestion. The APN-based session management congestion is, for example, a state in which the PGW 80 cannot execute data transmission processing by receiving a large amount of data that has specified the specific APN in the PGW 80. Further, the APN-based mobility management congestion is a state in which Attach from the UE cannot be accepted in the core network.

In Step S51, since the APN-based session management congestion is occurring, the PGW 80 transmits the congestion state notification message to the MME 60. Further, the PGW 80 configures, in the congestion state notification message, identification information of the UE that is performing communication that specifies the APN in which the session management congestion is occurring. The identification information of the UE may be, for example, an IMSI.

Next, the communication unit 13 acquires subscriber data regarding the UE configured in the congestion state notification message from the HSS 90 (S52). The communication unit 13 acquires the subscriber data by transmitting, for example, a message that specifies the IMSI of the UE configured in the congestion state notification message to the HSS 90. The subscriber data acquired from the HSS 90 includes a plurality of APNs that can be specified by the UE.

Next, the communication unit 13 transmits a NAS Deactivation EPS Bearer Context Request message in which the plurality of APNs included in the subscriber data have been configured to the UE configured in the congestion state notification message (S53). Alternatively, the communication unit 13 may transmit the NAS Deactivation EPS Bearer Context Request message to the UE for each APN. The communication unit 13 transmits the NAS Deactivation EPS Bearer Context Request message regarding the plurality of APNs to the UE, whereby the MME 60 is able to avoid the transmission of the NAS request message that has specified the plurality of APNs from the UE. In other words, the communication unit 13 transmits the NAS Deactivation EPS Bearer Context Request message to the UE in order to stop the transmission of the NAS request message that has specified the APN configured in the NAS Deactivation EPS Bearer Context Request message.

Figure 9:
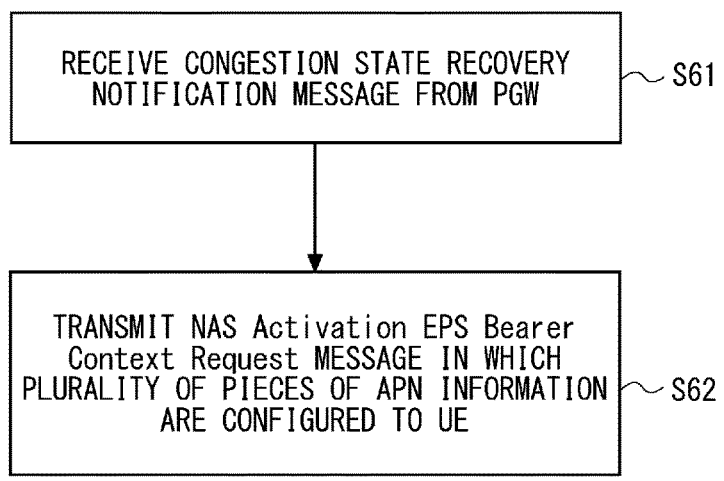
FIG. 9 is a diagram for describing a flow of processing of a case in which a PGW according to the third embodiment has recovered from the congestion state.

With reference next to FIG. 9, a flow of processing of a case in which the PGW 80 according to the third embodiment of the present disclosure has recovered from the congestion state will be explained. First, the congestion state detector 11 receives a congestion state recovery notification message indicating that the PGW 80 has recovered from the congestion state (S61).

Next, the communication unit 13 transmits a NAS Activation EPS Bearer Context Request message in which the plurality of APNs configured in the NAS Deactivation EPS Bearer Context Request message have been configured to the UE (S62). The communication unit 13 transmits the NAS Activation EPS Bearer Context Request message to the UE that has transmitted the NAS Deactivation EPS Bearer Context Request message.

Figure 10:
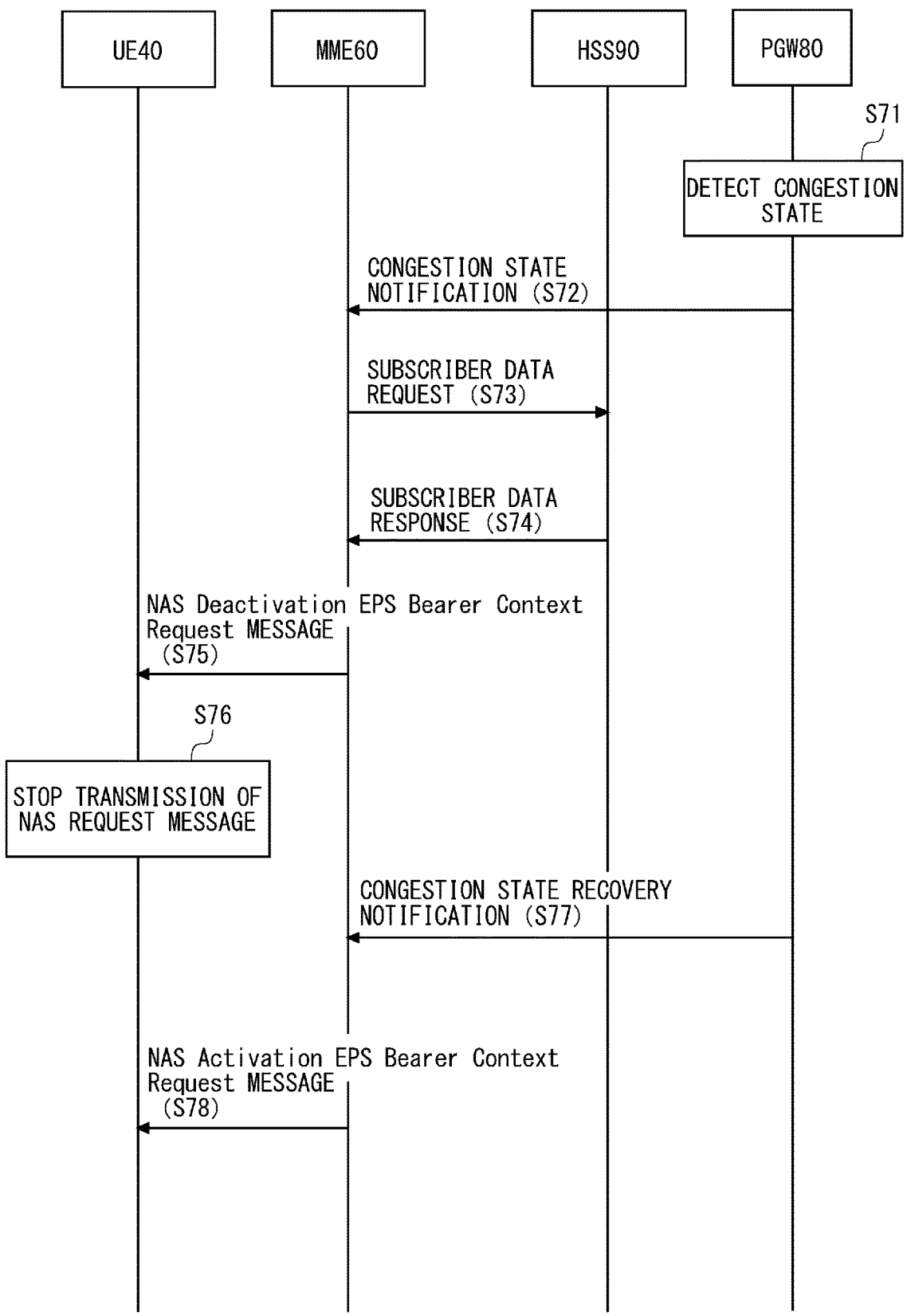
FIG. 10 is a diagram for describing a flow of processing when congestion occurs according to the third embodiment.

With reference next to FIG. 10, a flow of processing when congestion occurs in the UE 40, the MME 60, the HSS 90, and the PGW 80 according to the third embodiment of the present disclosure will be explained. It is assumed in FIG. 10 that the PDN connection has been established between the UE 40 and the PGW 80.

First, the PGW 80 detects the congestion state (S71). Next, the PGW 80 transmits the congestion state notification message to the MME 60 (S72). The IMSI of the UE that is performing communication in which the APN, which causes congestion, has been specified, is configured in the congestion state notification message. In FIG. 10, it is assumed that the IMSI of the UE 40 is configured in the congestion state notification message.

Since the processing regarding Steps S73, S74, and S76 is similar to that in Steps S43, S44, and S46 in FIG. 7, respectively, detailed descriptions thereof will be omitted. Further, since the processing regarding Step S75 is processing in which the REJECT message shown in Step S45 in FIG. 7 is replaced by a NAS Deactivation EPS Bearer Context Request message, detailed descriptions thereof will be omitted.

Next, the MME 60 receives, from the PGW 80, the congestion state recovery notification message indicating that the PGW 80 has recovered from the congestion state (S77). Next, the MME 60 transmits the NAS Activation EPS Bearer Context Request message that permits transmission of the NAS request message to the UE 40 (S78). The MME 60 may configure all the APNs configured in the NAS Deactivation EPS Bearer Context Request message in the NAS Activation EPS Bearer Context Request message or may configure some of the plurality of APNs configured in the NAS Deactivation EPS Bearer Context Request message in the NAS Activation EPS Bearer Context Request message.

As described above, the MME 60 according to the third embodiment of the present disclosure transmits the NAS Deactivation EPS Bearer Context Request message in which the plurality of APNs have been configured to the UE 40 also when the congestion state has occurred in the PGW 80, whereby it is possible to reduce the number of NAS request messages transmitted from the UE 40. It is therefore possible to prevent the congestion state in the PGW 80 from being further worsened.

Further, the MME 60 can transmit the NAS Activation EPS Bearer Context Request message to the UE 40 after the PGW 80 has recovered from the congestion state. The UE 40 starts transmission of the NAS request message after receiving the NAS Activation EPS Bearer Context Request message, whereby the MME 60 is able to avoid reception of the NAS request message while the congestion state is continuing in the PGW 80. In other words, the MME 60 is able to avoid the reception of the NAS request message from the UE 40 when the congestion state is continuing even when the back-off timer in which the NAS Deactivation EPS Bearer Context Request message is configured has expired.

In the following description, configuration examples of the core node 10 and the UE 40 described in the aforementioned embodiments will be explained.

Figure 11:
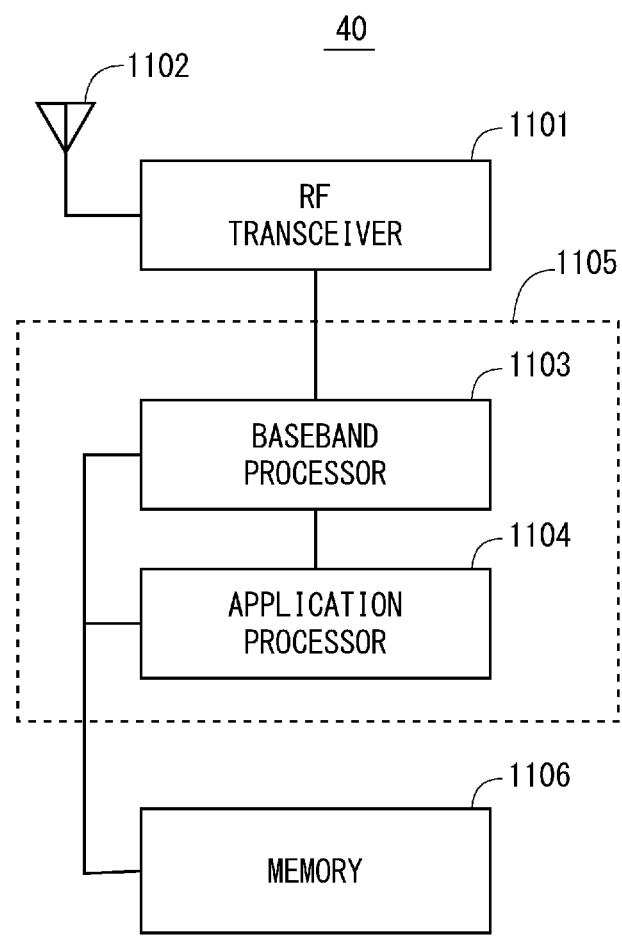
FIG. 11 is a configuration diagram of a UE 40 according to each of the embodiments.

FIG. 11 is a block diagram showing the configuration example of the UE 40. A Radio Frequency (RF) transceiver 1101 performs analog RF signal processing to communicate with the eNB 50. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the transmission RF signal to the antenna 1102. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

In the case of LTE and LTE-Advanced, for example, the digital baseband signal processing by the baseband processor 1103 may include signal processing of a Packet Data Convergence Protocol (PDCP) layer, a Radio Link Control (RLC) layer, a MAC layer, and a PHY layer. Further, the control plane processing by the baseband processor 1103 may include processing of a Non-Access Stratum (NAS) protocol, an RRC protocol, and MAC CE.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs control plane processing, may be integrated with an application processor 1104 described in the following.

The application processor 1104 is also referred to as a CPU, an MPU, a microprocessor, or a processor core. The application processor 1104 may include a plurality of processors (processor cores). The application processor 1104 loads a system software program (Operating System (OS)) and various application programs (e.g., a voice call application, a WEB browser, a mailer, a camera operation application, and a music player application) from a memory 1106 or from another memory (not shown) and executes these programs, thereby providing various functions of the UE 40.

In some implementations, as represented by a dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store a software module (computer program) including instructions and data for performing processing by the UE 40 described in the aforementioned embodiments. In some implementations, the baseband processor 1103 or the application processor 1104 may load the software module from the memory 1106 and execute the loaded software module, thereby performing the processing of the UE 40 described in the aforementioned embodiments.

Figure 12:
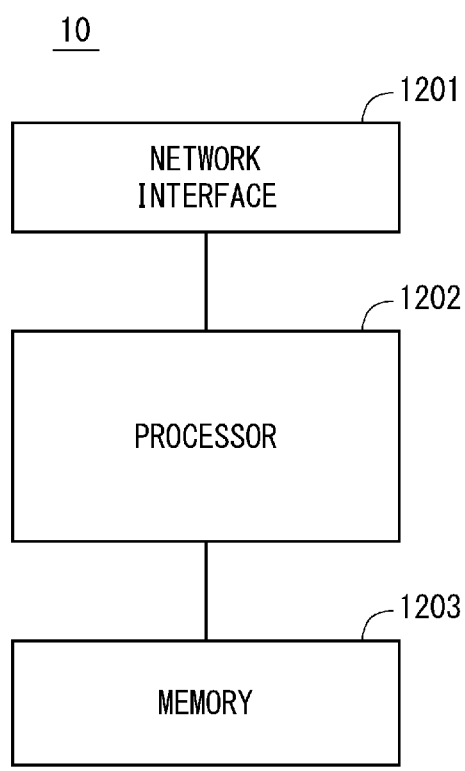
FIG. 12 is a configuration diagram of a core node 10 according to each of the embodiments.

FIG. 12 is a block diagram showing the configuration example of the core node 10. Referring to FIG. 12, the core node 10 includes a network interface 1201, a processor 1202, and a memory 1203. The network interface 1201 is used to communicate with the network node (e.g., eNB, MME, SGW, P-GW). The network interface 1201 may include, for example, a network interface card (NIC) conforming to the IEEE 802.3 series.

The processor 1202 loads software (computer program) from the memory 1203 and executes the loaded software, thereby performing the processing of the core node 10 described with reference to the sequence diagrams and flowcharts in the aforementioned embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage that is located apart from the processor 1202. In this case, the processor 1202 may access the memory 1203 via an I/O interface (not shown).

In the example shown in FIG. 12, the memory 1203 is used to store software modules. The processor 1202 loads these software modules from the memory 1203 and executes these loaded software modules, thereby performing the processing of the core node 10 described in the aforementioned embodiments.

Aa described above with reference to FIGS. 11 and 12, each of the processors included in the UE 40 and the core node 10 according to the aforementioned embodiments executes one or more programs including instructions to cause a computer to perform an algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The present disclosure is not limited to the aforementioned embodiments and may be changed as appropriate without departing from the spirit of the present disclosure.

While the present disclosure has been described with reference to the embodiments, the present disclosure is not limited to the aforementioned embodiments. Various changes that can be understood by those skilled in the art can be made to the configurations and the details of the present disclosure within the scope of the present disclosure.

This application is based upon and claims the benefit of priority from Japanese Patent Application No. 2016-040986, filed on Mar. 3, 2016, the disclosure of which is incorporated herein in its entirety by reference.

For example, some or all of the embodiments disclosed above can be described as, but not limited to, the following supplementary notes.

Supplementary Note 1

A core node comprising:
a congestion state detector configured to detect a congestion state of an own apparatus;
a communication unit configured to receive a NAS request message that has specified an APN from a radio terminal; and
a controller configured to determine that processing regarding the NAS request message will not be executed while the congestion state of the own apparatus is being detected,
wherein the communication unit transmits a reject message including a plurality of APNs that can be specified by the radio terminal to the radio terminal when it is determined in the controller that the processing regarding the NAS request message will not be executed.

Supplementary Note 2

The core node according to Supplementary Note 1, wherein the communication unit acquires information regarding all the APNs that can be specified by the radio terminal from an HSS that manages subscriber information of the radio terminal using identification information of the radio terminal.

Supplementary Note 3

The core node according to Supplementary Note 1 or 2, wherein the communication unit configures all the APNs that can be specified by the radio terminal in the reject message.

(Supplementary Note 4)

The core node according to any one of Supplementary Notes 1 to 3, wherein the communication unit transmits a recovery message indicating that the radio terminal is permitted to transmit a NAS request message to the radio terminal when it is detected in the congestion state detector that the own apparatus has recovered from the congestion state.

Supplementary Note 5

The core node according to Supplementary Note 4, wherein the communication unit configures at least one APN that is permitted to be specified by the radio terminal in the recovery message.

Supplementary Note 6

A core node comprising:
a congestion state detector configured to detect a congestion state of a gateway;
a controller configured to determine that processing regarding a NAS request message regarding a radio terminal specified in the gateway will not be executed while the congestion state of the gateway is being detected; and
a communication unit configured to transmit a reject message including a plurality of APNs that can be specified by the radio terminal to the radio terminal when it is determined in the controller that the processing regarding the NAS request message regarding the radio terminal will not be executed.

Supplementary Note 7

The core node according to Supplementary Note 6, wherein the communication unit acquires information regarding all the APNs that can be specified by the radio terminal from an HSS that manages subscriber information of the radio terminal using identification information of the radio terminal specified in the gateway.

Supplementary Note 8

The core node according to Supplementary Note 6 or 7, wherein the communication unit configures all the APNs that can be specified by the radio terminal in the reject message.

(Supplementary Note 9)
The core node according to any one of Supplementary Notes 6 to 8, wherein the communication unit transmits a recovery message indicating that the radio terminal is permitted to transmit a NAS request message to the radio terminal when it is detected in the congestion state detector that the gateway has recovered from the congestion state.

Supplementary Note 10

The core node according to Supplementary Note 9, wherein the communication unit configures at least one APN that is permitted to be specified by the radio terminal in the recovery message.

(Supplementary Note 11)
A radio terminal comprising:
a communication unit configured to receive a reject message indicating that processing regarding a NAS request message should be rejected,
wherein a plurality of APNs that can be specified in an own apparatus are included in the reject message, and transmission of the NAS request message that has specified the plurality of APNs configured in the reject message is stopped until a specific message transmitted from a core node is received when the reject message is received.

Supplementary Note 12

The radio terminal according to Supplementary Note 11, wherein the reject message indicates that the processing regarding the NAS request message transmitted to the core node should be rejected and a plurality of APNs including an APN specified by the NAS request message transmitted to the core node are configured in the reject message.

Supplementary Note 13

A communication method comprising:
detecting a congestion state of an own apparatus;
receiving a NAS request message that has specified an APN from a radio terminal;
determining that processing regarding the NAS request message will not be executed while the congestion state of the own apparatus is being detected; and
transmitting a reject message including a plurality of APNs that can be specified by the radio terminal to the radio terminal when it is determined that the processing regarding the NAS request message will not be executed.

Supplementary Note 14

A communication method comprising:
detecting a congestion state of a gateway;
determining that processing regarding a NAS request message regarding a radio terminal specified in the gateway will not be executed while the congestion state of the gateway is being detected; and
transmitting a reject message including a plurality of APNs that can be specified by the radio terminal to the radio terminal when it is determined that the processing regarding the NAS request message regarding the radio terminal will not be executed.

Supplementary Note 15

A program that causes a computer to execute the following processing of:
detecting a congestion state of an own apparatus;
receiving a NAS request message that has specified an APN from a radio terminal;
determining that processing regarding the NAS request message will not be executed while the congestion state of the own apparatus is being detected; and
transmitting a reject message including a plurality of APNs that can be specified by the radio terminal to the radio terminal when it is determined that the processing regarding the NAS request message will not be executed.

Supplementary Note 16

A program that causes a computer to execute the following processing of:
detecting a congestion state of a gateway;
determining that processing regarding a NAS request message regarding a radio terminal specified in the gateway will not be executed while the congestion state of the gateway is being detected; and
transmitting a reject message including a plurality of APNs that can be specified by the radio terminal to the radio terminal when it is determined that the processing regarding the NAS request message regarding the radio terminal will not be executed.

REFERENCE SIGNS LIST

10 CORE NODE
11 CONGESTION STATE DETECTOR

12 CONTROLLER
13 COMMUNICATION UNIT
20 RADIO TERMINAL
30 NETWORK
40 UE
41 CONTROLLER
42 COMMUNICATION UNIT
50 eNB
60 MME
70 SGW
80 PGW
90 HSS
100 EXTERNAL NETWORK

The invention claimed is:

1. A core node comprising:
at least one memory storing instructions, and
at least one processor configured to execute the instructions to:
detect a congestion state of the core node;
receive a Non-Access Stratum (NAS) request message that has specified an Access Point Name (APN) from a radio terminal;
determine that processing regarding the NAS request message will not be executed while the congestion state of the core node is being detected; and
transmit a reject message including a plurality of APNs that can be specified by the radio terminal to the radio terminal when it is determined that the processing regarding the NAS request message will not be executed,
wherein the at least one processor is further configured to execute the instructions to acquire information regarding all the APNs that can be specified by the radio terminal from a Home Subscriber Server (HSS) that manages subscriber information of the radio terminal using identification information of the radio terminal,
wherein the at least one processor is further configured to execute the instructions to, based on detecting that the core node has recovered from the congestion state, transmit a recovery message including the plurality of APNs that can be specified by the radio terminal to the radio terminal, and receive the NAS request message that has specified one APN included in the plurality of APNs from the radio terminal.

2. The core node according to claim 1, wherein the at least one processor is further configured to execute the instructions to configure all the APNs that can be specified by the radio terminal in the reject message.

3. A core node comprising:
at least one memory storing instructions, and
at least one processor configured to execute the instructions to:
detect a congestion state of a gateway;
determine that processing regarding a NAS request message regarding a radio terminal specified in the gateway will not be executed while the congestion state of the gateway is being detected; and
transmit a reject message including a plurality of APNs that can be specified by the radio terminal to the radio terminal when it is determined that the processing regarding the NAS request message regarding the radio terminal will not be executed,
wherein the at least one processor is further configured to execute the instructions to acquire information regarding all the APNs that can be specified by the radio terminal from an HSS that manages subscriber information of the radio terminal using identification information of the radio terminal specified in the gateway,
wherein the at least one processor is further configured to execute the instructions to, based on detecting that the core node has recovered from the congestion state, transmit a recovery message including the plurality of APNs that can be specified by the radio terminal to the radio terminal, and receive the NAS request message that has specified one APN included in the plurality of APNs from the radio terminal.

4. The core node according to claim 3, wherein the at least one processor is further configured to execute the instructions to configure all the APNs that can be specified by the radio terminal in the reject message.

5. A communication method comprising:
detecting a congestion state of an a core node;
receiving a NAS request message that has specified an APN from a radio terminal;
determining that processing regarding the NAS request message will not be executed while the congestion state of the core node is being detected;
transmitting a reject message including a plurality of APNs that can be specified by the radio terminal to the radio terminal when it is determined that the processing regarding the NAS request message will not be executed;
acquiring information regarding all the APNs that can be specified by the radio terminal from a Home Subscriber Server (HSS) that manages subscriber information of the radio terminal using identification information of the radio terminal; and
based on detecting that the core node has recovered from the congestion state, transmitting a recovery message including the plurality of APNs that can be specified by the radio terminal to the radio terminal, and receive the NAS request message that has specified one APN included in the plurality of APNs from the radio terminal.

* * * * *